(12) United States Patent
Ito et al.

(10) Patent No.: US 8,167,972 B2
(45) Date of Patent: May 1, 2012

(54) PROCESS FOR PRODUCING METAL NANOPARTICLE AND METAL NANOPARTICLE PRODUCED BY THE PROCESS

(75) Inventors: Takashi Ito, Ichikawa (JP); Hiroshi Sugai, Sendai (JP); Masato Watanabe, Sendai (JP)

(73) Assignee: N.E. Chemcat Corporation, Tokyo (JP)

( * ) Notice: Subject to any disclaimer, the term of this patent is extended or adjusted under 35 U.S.C. 154(b) by 362 days.

(21) Appl. No.: 12/306,938

(22) PCT Filed: Jun. 27, 2007

(86) PCT No.: PCT/JP2007/062921
§ 371 (c)(1),
(2), (4) Date: Dec. 30, 2008

(87) PCT Pub. No.: WO2008/001815
PCT Pub. Date: Jan. 3, 2008

(65) Prior Publication Data
US 2009/0317289 A1    Dec. 24, 2009

(30) Foreign Application Priority Data

Jun. 30, 2006  (JP) ................................. 2006-182563

(51) Int. Cl.
*B22F 9/30* (2006.01)
*B82Y 40/00* (2006.01)

(52) U.S. Cl. .............................. 75/345; 75/351; 977/896
(58) Field of Classification Search ................ 75/345
See application file for complete search history.

(56) References Cited

U.S. PATENT DOCUMENTS

| 5,965,212 A | 10/1999 | Dobson et al. |
| 6,254,662 B1 | 7/2001 | Murray et al. |
| 6,783,569 B2 * | 8/2004 | Cheon et al. .................. 75/348 |
| 2003/0177868 A1 * | 9/2003 | Guillet .......................... 75/722 |
| 2003/0215634 A1 | 11/2003 | Hattori et al. |
| 2006/0057384 A1 * | 3/2006 | Simard et al. ................ 428/403 |

FOREIGN PATENT DOCUMENTS

| JP | 62-61630 | 3/1987 |
| JP | 62-63603 | 3/1987 |
| JP | 5 65512 | 3/1993 |
| JP | 11-510314 | 9/1999 |
| JP | 11-323410 | 11/1999 |
| JP | 2000 323145 | 11/2000 |
| JP | 3268793 | 1/2002 |
| JP | 2003-203334 | 7/2003 |
| JP | 2003 260409 | 9/2003 |
| JP | 2003 306319 | 10/2003 |
| JP | 2004-292947 | 10/2004 |
| JP | 2005 48213 | 2/2005 |
| JP | 2005-105408 | 4/2005 |
| JP | 2005-183898 | 7/2005 |
| JP | 2005 272864 | 10/2005 |
| JP | 2005-314712 | 11/2005 |
| JP | 2007 95526 | 4/2007 |

OTHER PUBLICATIONS

Ayyappan, S. et al., "Nanoparticles of Ag, Au, Pd, and Cu produced by alcohol reduction of the salts", Journal of Materials Research, vol. 12, No. 2, pp. 398-401, Feb. 1997.*
Hayakawa, K. et al., "Preparation of Gold-Dendrimer Nanocomposites by Laser Irradiation and Their Catalytic Reduction of 4-Nitrophenol", Langmuir, vol. 19, pp. 5517-5521, Published on Web May 16, 2003.*
Iwamoto, Takashi et al., "Fct-kozo o Yusuru FePt Nano Ryushi no Chokusetsu Gosei to Jiki Tokusei", CSJ: The Chemical Society of Japan Koen Yokoshu, vol. 85, No. 1, p. 436, (2005).
Tsuji, Masaharu et al., "Fast Preparation and Shape Control of Metallic Nanostructures by Using Microwave Heating", Engineering Sciences Report, Kyushu University, vol. 27, No. 2, pp. 219-228, (2005).
Sun, Shouheng et al., "Monodisperse FePt Nanoparticles and Ferromagnetic FePt Nanocrystal Superlattices", Science, Reports, vol. 287, 1989-1992, (2000).
Takami, Akinori et al., "Laser-Induced Size Reduction of Noble Metal Particles", J. Phys. B, vol. 103, No. 8, pp. 1226-1232, (1999).
Watanabe, M. et al., "Microstructure and Magnetic Properties of High-Coercive Fe-Pt Alloy Thin Films", Materials Transactions, JIM, vol. 37, No. 3, pp. 489-493, (1996).
Japanese Office Action issued Jun. 14, 2011, in Patent Application No. 2007-168837 (with English-language translation).
Questioning in Japanese Application No. 2007-168837, dated Feb. 2, 2012. (w/English Translation).

\* cited by examiner

*Primary Examiner* — George Wyszomierski
(74) *Attorney, Agent, or Firm* — Oblon, Spivak, McClelland, Maier & Neustadt, L.L.P.

(57) ABSTRACT

The present invention has an object of providing a single-stage production method that enables the production of ultra fine metal nanoparticles and ordered alloy nanoparticles within solution.
The production method includes irradiating a solution of a salt or complex of a metal element, thereby decomposing and/or reducing the salt or complex within the solution and generating metal nanoparticles having an average particle size within a range from 0.3 to 100 nm within the solution.

15 Claims, 7 Drawing Sheets

PROCESS FOR PRODUCING METAL NANOPARTICLE AND METAL NANOPARTICLE PRODUCED BY THE PROCESS

TECHNICAL FIELD

The present invention relates to a process for producing metal nanoparticle and metal nanoparticle produced by the process.

BACKGROUND ART

Metal nanoparticles have unique physical and chemical properties, and industrial application of such particles is therefore attracting considerable attention. A variety of methods have been proposed as production methods for metal nanoparticles. These methods can be broadly classified into wet methods and dry methods, wherein a representative wet method is a method in which a salt or complex of a metal is reduced in solution by a co-existent reducing agent, and a representative dry method is a metal ingot gas evaporation method (Non-Patent Document 1). Among the various metal nanoparticles, although it is known that alloy nanoparticles, and particularly nanoparticles of alloys of a noble metal such as platinum, palladium, gold, silver, rhodium, ruthenium or iridium, and a base metal such as iron, cobalt, nickel, copper or chromium, have considerable practical significance in terms of their catalytic action and their electromagnetic properties or optical properties, the production of these alloy nanoparticles requires a multi-stage operation, and no simple production method is known. For example, solid solution alloys such as platinum-cobalt, platinum-nickel, platinum-iron and platinum-cobalt-chromium alloys have a high electrochemical oxygen reduction mass activity, and are useful as the active species of the cathode catalyst for a fuel cell, but the preparation includes, for example, causing a salt of a base metal such as cobalt to act upon platinum nanoparticles supported on a carbon carrier, subsequently performing either a neutralization to support the base metal as a hydroxide or a treatment with a reducing agent such as hydrazine to support the base metal as a metal, and then conducting further treatment at a high temperature of 800 to 900° C. that involves either performing a hydrogen reduction-alloying treatment or performing an alloying treatment under a stream of argon to form the alloy catalyst. As a result of this high-temperature heat treatment, the alloy crystallite size is typically 5 nm or greater, and obtaining a fine alloy catalyst with a crystallite size of not more than 3 nm has proven problematic (for example, Patent Document 1).

On the other hand, ordered alloy nanoparticles of platinum-iron or platinum-cobalt have a high magnetic anisotropy, and are therefore attracting much attention as high-density magnetic recording materials, but production of these alloys involves first preparing disordered alloy nanoparticles using a polyol reduction method within a high-temperature organic solvent of 260 to 300° C., subsequently supporting these nanoparticles on a substrate, and then conducting a second heat treatment at a high temperature of 500° C. or higher to finally obtain the targeted ordered alloy nanoparticles (Patent Document 2, Non-Patent Document 2). Because of this ordering treatment, fine ordered alloy nanoparticles having a particle size of less than 3 nm, such as those obtained using a wet nanoparticle production method, can not be obtained.

On the other hand, some prior techniques relating to methods that utilize laser light in the production of nanoparticles are already known. A method has been reported in which a gas containing carbonyl compounds of two different transition metals such as Fe and Co or Fe and Cr is irradiated with laser light, thereby yielding a γ-phase alloy, which is a high-temperature crystalline layer, in the form of microparticles, a powder or a thin film (Patent Document 3). This method is suitable for metals having compounds that can be gasified, but is difficult to apply to heavy elements such as platinum or palladium for which gasification is problematic.

A production method has been reported in which a coating solution comprising precursor disordered alloy nanoparticles is applied to a support, and the resulting coating film is then irradiated with laser light, thereby forming CuAu-type or $Cu_3Au$-type hard magnetic ordered nanoparticles (Patent Document 4). Furthermore, a production method for magnetic nanoparticles has been reported in which amorphous nanoparticles protected with organic ligands are prepared and purified in advance using a wet method such as a hot soap method, and these nanoparticles that have been stabilized by the organic ligands are then irradiated with laser light to effect a crystallization (Patent Document 5).

In order to obtain the targeted crystalline alloy nanoparticles, these conventional production methods require at least two stages, or as many as 3 to 5 stages if intermediate purification steps such as extractions or drying steps are also included, and as such, are long and complex processes that incur large losses in terms of resources and energy due to the heating and washing steps conducted using large volumes of solvent. Furthermore, because of the latter-half heat treatment, aggregation or particle size growth of the microparticles generated in the preceding steps is unavoidable.

Furthermore, methods for forming microparticles of metals or metal oxides using conventional laser ablation methods are widely known (for example, Patent Document 6, Patent Document 7, and Non-Patent Document 3). These are methods in which a solid metal raw material in a liquid phase is irradiated with laser light, thereby yielding microparticles having a smaller particle size than the raw material, and as such, are not bottom-up methods in which nanoparticles are formed from molecules, but so-called top-down methods in which solid agglomerates are reduced in size. These methods suffer various problems, including there being a limit to the degree of size reduction, and the fact that controlling the particle size distribution is not easy.

Meanwhile, in the case of Pt—Fe alloy, which is recognized as one of the alloys with the highest magnetic anisotropy among currently known magnetic materials, the smallest particle size that has been reported to date is 3 to 4 nm. Furthermore, as the particle size of ferromagnetic particles is reduced, the superparamagnetic critical size, at which the exchange interactions between electron spins lose out to thermal disturbances, leading to a loss of ferromagnetism, has been reported as approximately 3 nm at 300 K in the case of a Pt—Fe alloy (Non-Patent Document 4).

In other words, for future ultra high-density magnetic recording element applications, ferromagnetic nanoparticles that are as fine as possible, for example 3 nm or less, are required, but no production method has been established that is effective in producing such ultra fine ordered alloy nanoparticles, and even if such a method were to exist, it had been thought that the wall of superparamagnetism would be an impediment to achieving ferromagnetism within the normal temperature region.

Patent Document 1: Japanese Laid-open publication (kokai) No. 2000-323145

Patent Document 2: U.S. Pat. No. 6,254,662

Patent Document 3: Japanese Patent Publication No. 3,268, 793, Japanese Laid-open publication (kokai) No. Hei 5-65512

Patent Document 4: Japanese Laid-open publication (kokai) No. 2003-260409

Patent Document 5: Japanese Laid-open publication (kokai) No. 2005-48213

Patent Document 6: Japanese Laid-open publication (kokai) No. 2005-272864

Patent Document 7: Japanese Laid-open publication (kokai) No. 2003-306319

Non-Patent Document 1: Masaaki Oda, Ultra Fine Particles, edited by Hayashi, Ueda and Tazaki, 115, 1988, published by Mita Shuppan Non-Patent Document 2: S. Sun et al., Science, vol. 287, 1989, 17 Mar. 2000

Non-Patent Document 3: S. Koda et al., J. Phys. Chem. B, 103, p 1226 to 1232 (1999)

Non-Patent Document 4: M. Watanabe et al., Mater. Trans. JIM, vol. 37, 489, 1996

DISCLOSURE OF INVENTION

Problems Invention Aims to Solve

The present invention aims to address the above problems associated with the conventional technology, and has an object of providing a simple and high-yielding production method that enables targeted metal nanoparticles, solid solution alloy nanoparticles of a noble metal and a base metal, or ordered alloy nanoparticles that have conventionally required an additional ordering treatment, to be produced directly in a single stage, within a solution or a co-solution of a salt and/or a complex of the constituent elements.

Means for Solution of the Problems

The present invention provides, as a means to achieving the above object, a production method for metal nanoparticles that comprises irradiating a solution of a salt and/or complex of a metal element with laser light, thereby decomposing and/or reducing the salt and/or complex within the solution and directly generating metal nanoparticles having an average particle size within a range from 0.3 to 100 nm within the solution.

The present invention preferably provides a production method for metal nanoparticles having an average particle size of 0.3 to 10 nm, and more preferably an average particle size of 0.3 to 3 nm.

Furthermore, the present invention also provides the production method for metal nanoparticles described above, wherein a coordinating organic protective agent, which during irradiation of the solution with the laser light, coordinates with the generated metal nanoparticles and prevents aggregation, is added to the solution in advance.

Moreover, the present invention also provides the production method for metal nanoparticles described above, wherein a decomposition-reduction promoter (hereafter abbreviated to "promoter") that absorbs the laser light and promotes the decomposition and/or reduction of the salt and/or complex of the metal is added to the solution. The present invention also provides a production method for metal nanoparticles wherein this promoter is an oxygen-containing organic compound, and a production method for metal nanoparticles wherein this promoter is an alcohol.

The present invention also provides the production method for metal nanoparticles described above, wherein the salt and/or complex of the metal element is a salt and/or complex of one metal element selected from the group consisting of platinum, palladium, gold, silver, rhodium, ruthenium and iridium.

Furthermore, the present invention also provides the production method for metal nanoparticles described above, wherein the salt and/or complex of the metal element comprises a salt and/or complex of at least one element selected from the group consisting of platinum, palladium, gold, silver, rhodium, ruthenium and iridium (group A), and a salt and/or complex of at least one element selected from the group consisting of iron, cobalt, nickel, copper and chromium (group B), and the obtained metal nanoparticles are composed of an alloy of these elements.

Furthermore, the present invention also provides the production method described above wherein the alloy is a solid solution alloy, and the production method wherein the alloy is an ordered alloy.

Furthermore, the present invention also provides metal nanoparticles having a particle size within a range from 0.3 to 100 nm, produced using the production method described above. As these alloy nanoparticles, the present invention also provides alloy nanoparticles, solid solution alloy nanoparticles, and ordered alloy nanoparticles.

BEST MODE OF CARRYING OUT INVENTION

A more detailed description of the present invention is presented below. In the present invention, the term "room temperature" means a temperature of 15 to 25° C. Furthermore, in the present invention, the term "nanoparticles" refers to microparticles having a particle size within a range from 0.3 to 100 nm.

In a production method for metal nanoparticles according to the present invention, a salt and/or complex of a metal element is used as a raw material. Although the invention is not dependent on the variety of metal, the metal is preferably at least one metal selected from the group consisting of platinum, palladium, gold, silver, rhodium, ruthenium and iridium (hereafter abbreviated as "group A", wherein these metals are frequently referred to as the noble metal elements). In the production method for metal nanoparticles of the present invention, a solution of a salt and/or complex of the metal element is irradiated with laser light, thereby causing decomposition and/or reduction of the salt and/or complex within the solution. In other words, a salt and/or complex of the metal is selected so that it either undergoes spontaneous decomposition and/or reduction upon laser light irradiation, or does not undergo spontaneous decomposition and/or reduction, but undergoes decomposition and/or reduction upon laser light irradiation when a decomposition-reduction promoter described below is added. Examples of salts that can be used include hydrochlorides, hydrobromates, hydroiodides, chlorates, bromates, iodates, nitrates and sulfates, as well as salts of organic carboxylic acids R—COOH (wherein, R represents a C1 to C20 alkyl group, aralkyl group, alkenyl group or aryl group) such as acetates, propionates, butyrates, oleates, benzoates and naphthylates. Furthermore, examples of the ligands of the complex include CO, NO, R—COO$^-$, RCN, RNC, $R^1R^2R^3N$, $R^1COC(R^2)=C(O^-)R^3$, R—$C_6H_4O^-$, R—$C_6H_4S^-$, $R^1R^2R^3P$ and $R^1R^2R^3PO$ (wherein, R is as defined above, $R^1$, $R^1$ and $R^3$ each represents, independently, an alkyl group, aralkyl group or aryl group, or alternatively, $R^1$ and $R^2$, $R^2$ and $R^3$, or $R^3$ and $R^1$ may be linked together to form a divalent group). Specific examples of these types of ligands include $CH_3COO^-$, $C_2H_5COO^-$, $CH_3CN$, $C_6H_5CN$, $NH_3$, $CH_3COCH=C(O^-)CH_3$ and $CF_3COCF=C(O^-)CF_3$, and of these, $CH_3COC(H)=C(O^-)CH_3$ is preferred.

In those cases where the metal is platinum, specific examples of metal salts and complexes that can be used favorably include platinum chloride, chloroplatinic acid, sodium chloroplatinate, potassium chloroplatinate, tetraammine platinum dichloride, dinitrodiamino platinum, dichlorodiammine platinum, acetylacetonato platinum, and p-fluoroacetylacetonato platinum.

Furthermore, in the production of an alloy of the present invention, a co-solution of the salts or complexes of the constituent elements is first prepared. In those cases where the alloy to be produced is an alloy of at least one element selected from the group A, and at least one element selected from the group consisting of chromium, iron, cobalt, nickel and copper (group B), although the present invention is not dependent on the variety or form of the salt and/or complex of the group A element and the salt and/or complex of the group B element, the salts and complexes listed above can be used favorably as the salt and/or complex of the group A element, and examples of salts that can be used as the group B salt include hydrochlorides, hydrobromates, hydroiodides, chlorates, bromates, iodates, nitrates and sulfates, as well as salts of organic carboxylic acids R—COOH (wherein, R is as defined above) such as acetates, propionates, butyrates, oleates, benzoates and naphthylates. Furthermore, examples of the ligands of the complex include CO, NO, R—COO$^-$, RCN, RNC, $R^1R^2R^3N$, $R^1COC(R^2)=C(O^-)R^3$, R—$C_6H_4O^-$, R—$C_6H_4S^-$, $R^1R^2R^3P$ and $R^1R^2R^3PO$ (wherein, R, $R^1$, $R^2$ and $R^3$ are as defined above, and $R^1$ and $R^2$, $R^2$ and $R^3$, or $R^3$ and $R^1$ may be linked together to form a divalent group). Specific examples of these types of ligands include $CH_3COO^-$, $C_2H_5COO^-$, $CH_3CN$, $C_6H_5CN$, $NH_3$, $CH_3COCH=C(O^-)CH_3$ and $CF_3COCF=C(O^-)CF_3$, and of these, $CH_3COC(H)=C(O^-)CH_3$ is preferred.

In those cases where the group B metal is, for example, iron, specific examples of metal salts that can be used favorably as the metal salt of the group B element include ferrous chloride, ferric chloride, iron (II) bromide, iron (III) bromide, iron (III) fluoride, ferric nitrate, ferrous sulfate, ferrous acetate, iron (III) citrate, iron (III) acrylate, ferrous ammonium sulfate, ferric ammonium sulfate, iron (III) ammonium oxalate, iron (II) gluconate, iron (II) gluconate and iron (II) naphthenate, whereas examples of the metal complex include iron (III) acetylacetonate, iron (III) ethoxide, iron pentacarbonyl, diiron nonacarbonyl, triiron dodecacarbonyl, ferrocene, and cyclopentadienyl iron (I) dicarbonyl dimer.

In those cases where a group A element is not used, and a solution of only a salt or complex of at least one element of the group B is irradiated with laser light, it is thought that metal nanoparticles that yield a dark-colored colloid are generated in the initial stages of the irradiation, but if this colloid is left to stand in the open air, then a color change is observed to a colloid that has the characteristic coloring of the oxide of the group B metal. If a group A element is also added to the raw material solution, then this type of color change does not occur, and the zero valence state of the group B metal is stabilized by alloying with the group A element.

There are no particular restrictions on the solvent, provided it is capable of dissolving the salt or complex of the metal. A solvent with a high degree of dissolution may be selected in accordance with the variety of the salt and/or complex being used, from among protic solvents such as water, methanol, ethanol, n-propanol and isopropanol, aprotic polar solvents such as diethyl ether, tetrahydrofuran, acetone, acetonitrile, methylene dichloride and chloroform, and non-polar solvents such as benzene, toluene and xylene. Alcohol solvents such as methanol, ethanol, n-propanol and isopropanol also function as decomposition-reduction promoters, and are consequently preferred.

There are no particular restrictions on the concentration of the salt or complex within the solution, provided the salt or complex dissolves in the solvent. The concentration is typically from 1.0 mol/L to 0.0001 mol/L, preferably from 0.50 mol/L to 0.0005 mol/L, and more preferably from 0.10 mol/L to 0.002 mol/L.

There are no particular restrictions on the wavelength of the laser used for irradiating the solution, provided the solution exhibits absorption of the wavelength. The wavelength is typically from 200 to 12,000 nm, and is preferably from 300 to 1,100 nm. In other words, infrared lasers, visible lasers, ultraviolet lasers, and short-wavelength far-ultraviolet lasers and the like can be used. Nd-YAG pulsed lasers (wavelength: 1,064 nm, second harmonic: 532 nm, third harmonic: 355 nm) and excimer pulsed lasers (248.5 nm) are particularly favorable. The energy, pulse width, pulse number and irradiation time and the like for the laser are optimized in accordance with the degree of decomposition or reduction of the raw material salt and/or complex within the solution, and can be used to control the shape, composition and particle size distribution and the like of the generated nanoparticles. Typically, the laser energy is preferably from 1 mJ to 10 J, the output is from 0.1 W to 20 W, the pulse speed is from 0.1 Hz to 20 Hz, and the irradiation time is from 1 second to 1 hour.

In those cases where the solution is an aqueous solution system, the solution can be placed in a quartz beaker, and the laser can then be irradiated perpendicularly directly into the solution from the open upper surface of the beaker, but in the case of an organic solvent, a sealed vessel is preferably used, in which the laser-incident surface is formed as a quartz window, and the atmosphere inside the vessel is substituted with an inert gas prior to the laser irradiation. By forming the surface of the vessel on the opposite side to the laser-incident surface as another quartz window, placing a laser power meter in contact with this other quartz window, and monitoring the quantity of laser power absorbed by the solution, the degree of progress and the endpoint of the reaction can be detected.

When irradiating the laser light into the solution, a coordinating organic protective agent that coordinates with the generated metal nanoparticles and prevents aggregation is preferably added to the solution in advance. There are no particular restrictions on the coordinating organic protective agent, provided it is an organic compound that either coats the surface of the metal nanoparticles or coordinates to the surface, thereby preventing aggregation and fusion of the metal nanoparticles. Examples of the coordinating organic protective agent include, for example, organic ligands typically used in the formation of metal complexes, namely, organic compound monomers having a $R^4$—X structure (wherein, $R^4$ can represent an alkyl group, alkenyl group, aralkyl group or aryl group or the like, and X can represent a $NH_2$ group, CN group, COOH group, OH group or SH group or the like), a $R^1$—Y—$R^2$ structure (wherein, $R^1$ and $R^2$ are each independently as defined above, and Y can represent O, S, C=O, C=NH or NHCO or the like) or a $ZR^1R^2R^3$ structure (wherein, $R^1$, $R^2$ and $R^3$ are as defined above, and Z can represent N or P or the like), and polymers containing these coordinating functional groups X, Y or Z, and of these, C6 to C18 long-chain alkylamines, carboxylic acids, ethers or nitriles, and polymers such as tertiary amine polymers, polyethers, polyesters or polyamides can be used particularly favorably. In terms of the variety of coordinating organic compound used, and the quantity of the compound added to the solution, the most appropriate compound and the most appropriate quantity must be selected with due consideration of factors such as the shape, particle size, particle size distribution and intended application of the targeted metal nanoparticles. In other words, if the nanoparticles are excessively stabilized, then during use in accordance with their intended application, decomposition or elimination of these ligands may become difficult, and the ligands may have a poisoning effect.

Furthermore, in the production method for metal nanoparticles according to the present invention, in those cases where the salt and/or complex of the metal does not undergo spontaneous decomposition and/or reduction upon irradiation with the laser light, a decomposition-reduction promoter that absorbs the laser light and promotes the decomposition of the salt and/or complex of the metal element is added to the solution containing the metal element salt or complex that represents the starting raw material. The "decomposition-reduction promoter" is an organic compound that exhibits absorption in the wavelength region of the laser light used for the irradiation, and in those cases where a solution containing only the raw material salt and/or complex does not undergo reduction and/or decomposition upon irradiation with the laser light, it refers to a compound which, when added to the solution, is able to cause reduction and/or decomposition of the salt and/or complex of the metal. This decomposition-reduction promoter normally causes absolutely no decomposition and/or reduction of the salt and/or complex, or only very slow decomposition and/or reduction, when simply added to the solution at room temperature without conducting laser light irradiation. The decomposition-reduction promoter is preferably soluble in the solution of the raw material salt and/or complex, and therefore a solvent and a decomposition-reduction promoter that enable such dissolution are selected. This type of decomposition-reduction promoter is preferably an oxygen-containing organic compound, and alcohols such as ethanol, 1-propanol, 2-propanol and 2-dimethoxyethanol can be used particularly favorably.

In the production method of the present invention, the metal nanoparticles are obtained as a colloid that is dispersed within the solution in which the raw material salt and/or complex was dissolved. Nanoparticles that have been stabilized by a coordinating organic protective agent can sometimes be isolated as a nanoparticle gel by performing a concentration under reduced pressure, and then adding a poor solvent.

On the other hand, the nanoparticles can also be supported directly onto a substrate, in the form of a colloid solution or a dispersion obtained by concentrating such a colloid solution, without first isolating the nanoparticles. Examples of substrates that may be used include typical materials such as silicon substrates, glass substrates, polyimide substrates and carbon paper, and the colloid described above can be coated onto the substrate using a method such as a dropwise coating method, a dipping method or a spin coating method. Moreover, performing patterning on the substrate using an inkjet method, a dip-pen lithography method, or a contact printing method is also possible. Furthermore, in those cases where the metal nanoparticles are to be used as a catalyst, the colloid may be used as is, or the metal nanoparticles may be adsorbed and supported on a typical carrier such as alumina, silica, titania, zeolite, activated carbon, carbon black, carbon nanotubes or carbon horns.

The shape, particle size distribution, average particle size and the like of the metal nanoparticles of the present invention can be observed and measured using a transmission electron microscope (TEM). Using a field of view at a magnification of 1,000,000× to 10,000,000×, at least 100 particles are selected at random, the shape and particle size (representative diameter) of the transmission image of each particle are measured, and statistical processing is conducted to determine a number average particle size $\mu$, a standard deviation $\sigma$, and a coefficient of variation ($\sigma/\mu$). Furthermore, the particle size distribution can also be determined using a dynamic light scattering method (DPS), in which light is irradiated onto the colloid solution and the particle size distribution is determined from the Doppler effect of the scattered light, and three types of particle size distributions, namely intensity-based, volume-based and number-based particle size distributions, are obtained with the values of $\mu$, $\sigma$ and ($\sigma/\mu$) being calculated for each of these distributions, although these values are not necessarily effective in the measurement of the particle size distribution of sub-nanometer level particles such as the nanoparticles of the present invention.

If energy dispersive X-ray analysis (EDX) is used in combination with a TEM, then elemental analysis of individual nanoparticles can be conducted on the basis of the characteristic X-ray spectrum obtained by using an electron beam to irradiate individual particles observed in the high-magnification visual field of the TEM, and by conducting this measurement for a plurality of particles, an average composition can be determined.

Furthermore, in the case of alloy nanoparticles of a group A metal element and a group B metal element, if the average particle size of the particles exceeds 3 nm, then determination as to whether the crystalline structure is a solid solution or an ordered alloy can be made on the basis of the X-ray diffraction pattern, wherein the degree of alloying can be evaluated based on the degree of the deviation of the diffraction angle $2\theta$ from the characteristic diffraction angle $2\theta$ of the lone metals, and the crystallite size can be determined from the half width of the main peak. However, in the case of ultra fine nanoparticles having an average particle size of not more than 3 nm, and particularly 1 nm or less, the normal X-ray diffraction peak becomes very broad, and evaluating the crystal structure, ordering and/or crystallite size for the alloy becomes problematic. Using the present invention, ultra fine CuAu-type ordered alloy nanoparticles having an average particle size of 3 nm or less can be produced, and confirmation of the ordering can be obtained by measuring the distinctive magnetic property of the ferromagnetic ordered alloy. Even with crystallized alloys for which a lattice fringe is observed in a TEM observation conducted at a high magnification of 5,000,000× to 10,000,000×, in the case of a simple solid solution alloy, the MH curve in a vibrating sample measurement method does not display a hysteresis loop. In the case of ordered alloying, the MH curve displays a hysteresis loop, and the degree of ordering can be evaluated from the H value when M is zero, namely from the value of the coercive force Hc. In the case of FePt alloy, which is recognized as one of the alloys having the highest magnetic anisotropy among all the currently known magnetic materials, the finest particle size that has been reported to date is from 3 to 4 nm, and conventionally it has been thought that making the particles any finer would result in the particles losing their magnetic anisotropy within the normal temperature region as a result of the superparamagnetic effect.

According to the present invention, by simply subjecting the solution of the raw material salt or complex to irradiation with a laser light for a predetermined time period, metal nanoparticles having an average particle size of 0.3 to 100 nm, and preferably 0.3 to 30 nm, and even more preferably 0.3 to 3 nm, can be formed directly within the solution.

If a co-solution of a plurality of metal elements is used, then an alloy can be produced directly. By selecting at least one of platinum and palladium from the group A elements, selecting at least one of iron and cobalt from the group B elements, and irradiating a laser into a co-solution of salts or complexes of these elements, fct-type (face-centered tetragonal crystal) ordered alloy nanoparticles, which are unable to be generated conventionally without first producing amorphous alloy nanoparticles using a high-temperature wet method at a temperature of 300° C. or higher and then conducting an additional alloy ordering treatment, can be produced via a single step.

Moreover, according to VSM (vibrating sample magnetometer) evaluations, an ultra fine ordered alloy produced using the production method of the present invention exhibits ferromagnetism even at particle sizes of 3 nm or less, which conventionally has been thought to be a size at which, upon transition to superparamagnetism, the particles rapidly lose their ferromagnetism, and can highly probably claim the title of "smallest ferromagnetic magnet" reported to date. The reason that the production method of the present invention is able to generate this type of "smallest ferromagnetic magnet" is still not entirely clear, but it is thought to be due to the fact that the uniaxial magnetic anisotropy energy constant for the ordered alloy produced using the production method of the present invention is larger than conventionally recognized values.

These type of ultra small ferromagnetic nanoparticles can be applied to a wide range of applications, but applications within the following three fields hold particular promise; (1) ultra high-density magnetic recording materials, (2) magnetic marking nanoparticles for use in medical diagnoses, and (3) spin-dependent single electron devices.

In (1), in order to improve the S/N ratio during reproduction, the ferromagnetic particles of the medium material must be ordered nanoparticles in which the particle size is as small as possible and the particle size distribution is as sharp as possible, and in the case of FePt, conventionally the smallest particle size capable of retaining ferromagnetism has been recognized as 3 nm, and the highest recording density has been recognized as 50 Tb/in$^2$, but if the production method of the present invention is able to reduce the particle size to 1 nm or smaller, then an increase in the recording density from several fold to approximately one order of magnitude can be expected. Furthermore, in order to enable perpendicular magnetic recording, the axis of easy magnetization for FePt (the c axis) must be aligned perpendicularly to the medium surface, but if the nanoparticles are in an ordered state when produced as is the case of the nanoparticles of the present invention, then it is possible that the orientation of the nanoparticles can be controlled by coating the particles onto the medium substrate and then applying a strong magnetic field in a direction perpendicular to the substrate. In cases such as conventional methods where a high-temperature treatment must be conducted following production to order the nanoparticles, this type of orientation control has proven impossible.

In (2), conventionally, magnetic iron oxide nanoparticles have been used. However, magnetic iron oxide is superparamagnetic at normal temperatures, and in order to enable magnetic detection, a magnetic field needed to be applied externally.

If ordered alloy nanoparticles of the present invention are used instead of iron oxide nanoparticles, then magnetic detection is possible even without application of an external magnetic field, enabling miniaturization and simplification of the detection system. Furthermore, whereas the saturation magnetization for iron oxide in a superparamagnetic state is 5 to 6 kG, the saturation magnetization for ordered alloy FePt of the present invention is 14.5 kG, i.e. 2 to 3 times the intensity of iron oxide, meaning using the FePt particles enables magnetic signal detection that is from several times to an order of magnitude larger than that obtained by using iron oxide with applying an external magnetic field.

(3) represents application within the field of spin electronics, which has been the subject of intensive research and development in recent years, wherein ordered alloy nanoparticles of the present invention having a particle size at the 1 nm level can be used for the ferromagnetic dot portions that conduct switching between parallel and antiparallel magnetizations of a magnetic material.

Examples of the present invention are presented below although the present invention is not limited by the following examples.

EXAMPLES

Example 1

A quartz beaker having a diameter of 55 mm, a height of 70 mm and an internal capacity of 100 mL was charged with 50 ml of ultra pure water as a solvent, and 207 mg of chloroplatinic acid $H_2PtCl_6.6H_2O$ and 210 mg of citric acid monohydrate were dissolved in the water. An excimer pulsed laser using KrF gas and having a wavelength of 248.5 nm was irradiated through the side surface of the quartz beaker at HV of 25 kV, and with a laser energy of 630 mJ and a frequency of 40 Hz. A laser power meter detector was positioned on the side of the beaker opposite to the laser-incident surface, the output of the laser light transmitted through the quartz beaker was monitored, and after 10 minutes, when the transmission quantity of the laser light reached saturation and the reaction was thought to be complete, the laser irradiation was halted. The initial yellow transparent solution changed to a dark brown colloid solution. Several drops of this colloid were sampled, dripped onto a Cu sheet mesh, dried for several hours at room temperature, and then subjected to a transmission electron microscope—energy dispersive X-ray analysis (TEM-EDX analysis). The TEM was a HF-2200 device manufactured by HITACHI, observation was conducted with an accelerating voltage of 200 kV, at a direct magnification of 20,000, 50,000, 100,000 and 500,000×, and a 10-fold enlarged TEM image was obtained as a photograph. The EDX used a VANTAGE device manufactured by NORAN at an accelerating voltage of 200 kV. The beam size was 1 nm. The TEM confirmed the generation of ultra fine nanoparticles with a narrow particle size distribution, having an average particle size μ of 2.0 nm and a standard deviation a of 0.2 nm. Electron beam diffraction revealed diffraction rings of 2.19 Å, 1.94 Å and 1.38 Å, confirming that the particles were platinum crystals. The citric acid monohydrate functions as a decomposition-reduction promoter for the platinum salt upon laser light irradiation, and also functions as a coordinating organic protective agent for the produced platinum nanoparticles.

Example 2

Figure 1:
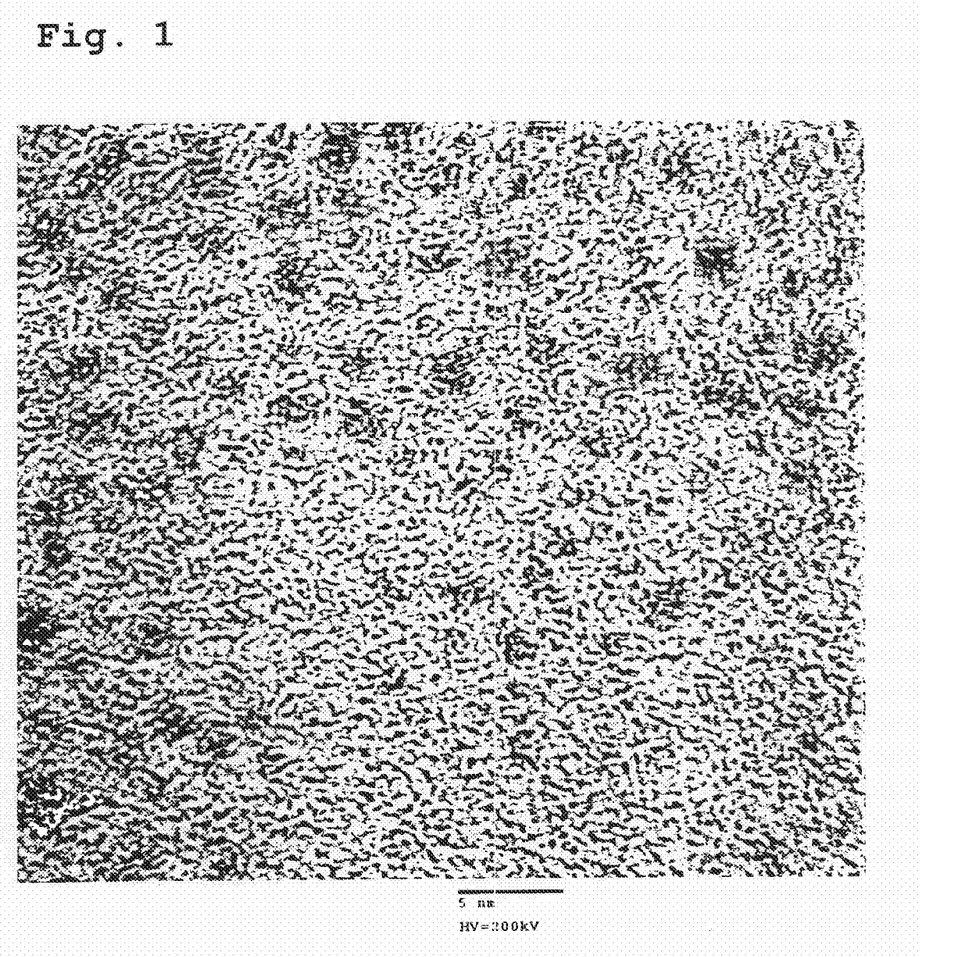

A quartz beaker was charged with 50 mL of ethanol as a solvent, and 47.1 mg of iron (III) acetylacetonate, 26.2 mg of platinum (II) acetylacetonate, and 11.1 mg of poly-N-vinylpyrrolidone (PVP) as a coordinating organic protective agent were dissolved in the solvent. While acting as the solvent, the ethanol also simultaneously functions as a decomposition-reduction promoter for the iron and platinum complexes. Following nitrogen substitution of the atmosphere, an excimer pulsed laser was irradiated through the side surface of the quartz beaker at HV of 25 kV, and with a laser energy of 410 mJ and a frequency of 40 Hz, for a period of 20 minutes. The initial yellow transparent solution changed to a dark red-brown colloid solution. Subjecting the colloid to TEM-EDX analysis confirmed the generation of ultra fine nanoparticles with a narrow particle size distribution, having an average particle size μ of 1.5 nm and a standard deviation 6 of 0.2 nm. The particles were too small to enable detection of distinct diffraction rings in the electron beam diffraction. However, inspection of a photograph at a magnification of 5,000,000× (see FIG. 1) revealed a very fine lattice fringe within the interior of each particle, indicating a high degree of crystallinity.

EDX detected Pt and Fe peaks in addition to the Cu and C peaks, but no oxygen O peak was detected. The intensity ratio for the Fe and Pt peaks was approximately 1:1.

Figure 2:
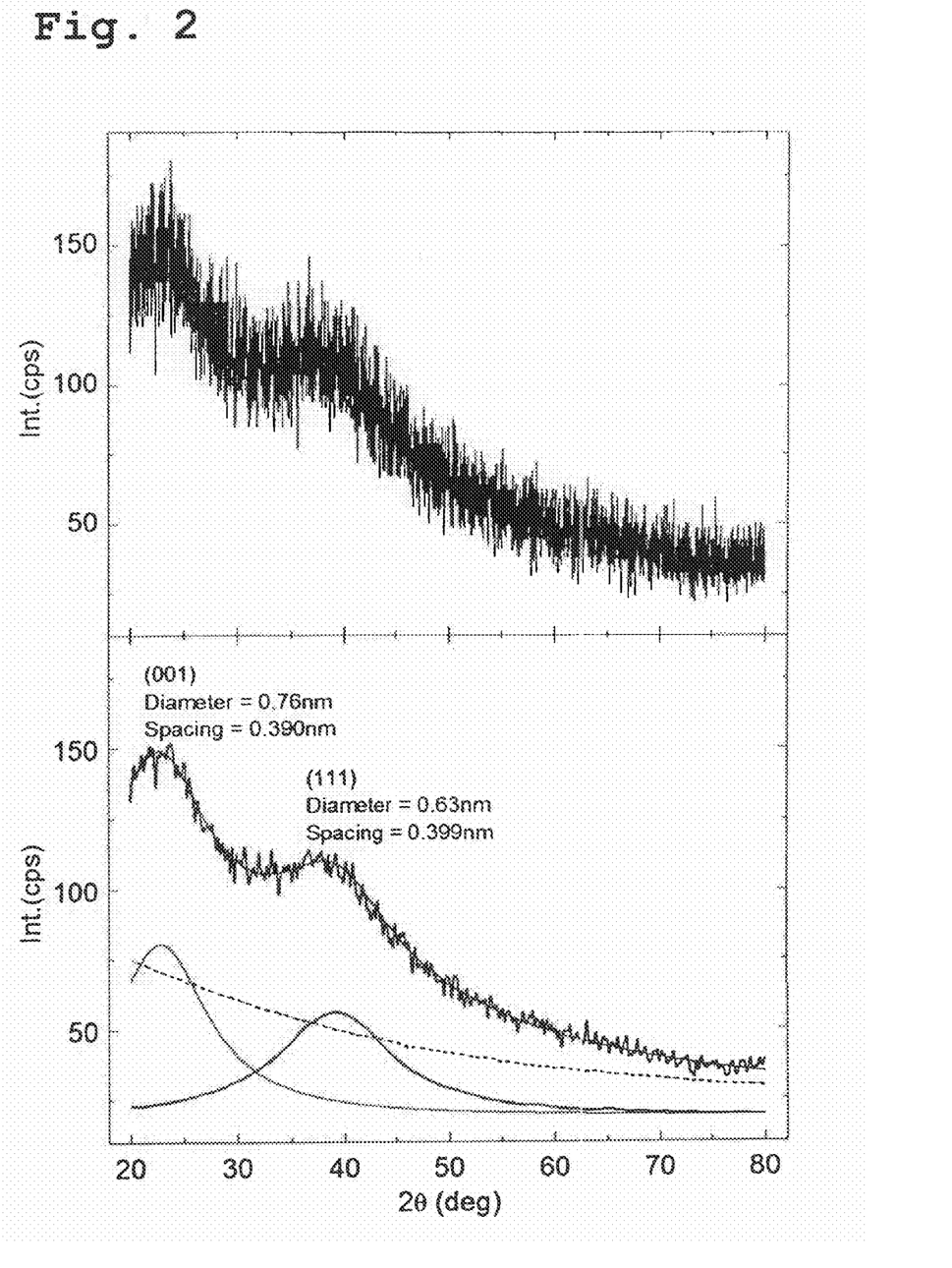

A concentrated colloid obtained by subjecting the colloid solution to distillation under reduced pressure at room temperature was dripped onto a non-reflective silicon substrate, air-dried at room temperature, and then measured by X-ray diffraction. FIG. 2 shows the X-ray diffraction pattern (XRD pattern) and the peak separation curves. Broad curves having peaks at 2θ=23 deg and in the vicinity of 40 deg respectively were obtained. The solvent-derived baseline was subtracted, peak separation was performed, the peak at 2θ=23 deg was attributed to fct (face-centered tetragonal crystal) Fe—Pt (001), the peak in the vicinity of 2θ=40 deg was attributed to Fe—Pt (111), and the crystallite sizes were calculated as 0.8 nm and 0.6 nm, respectively.

Figure 3:
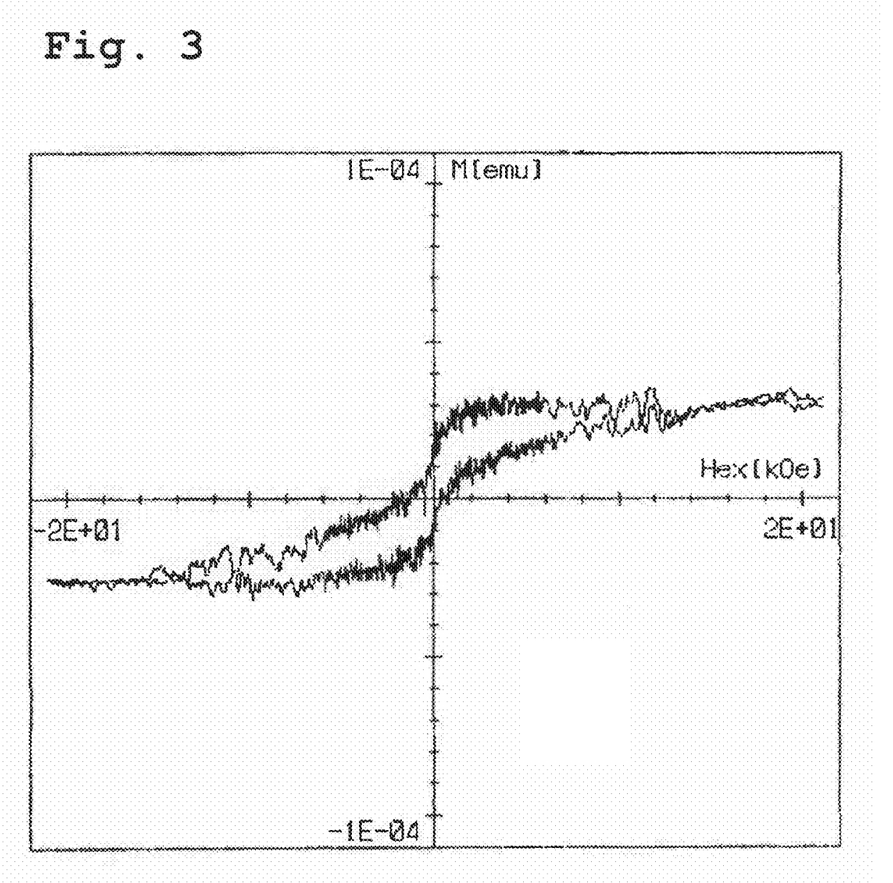

A maximum magnetic field of 20 kOe was applied with a vibrating sample magnetometer (VSM), and the magnetization-magnetic field (MH) correlation data for the FePt ordered alloy nanoparticles of example 2 were measured at room temperature. The thus obtained VSM magnetic property MH plot is shown in FIG. 3. The plot shows a clear hysteresis loop, indicating magnetic anisotropy. The coercive force was 1.04 kOe.

Example 3

Figure 4:
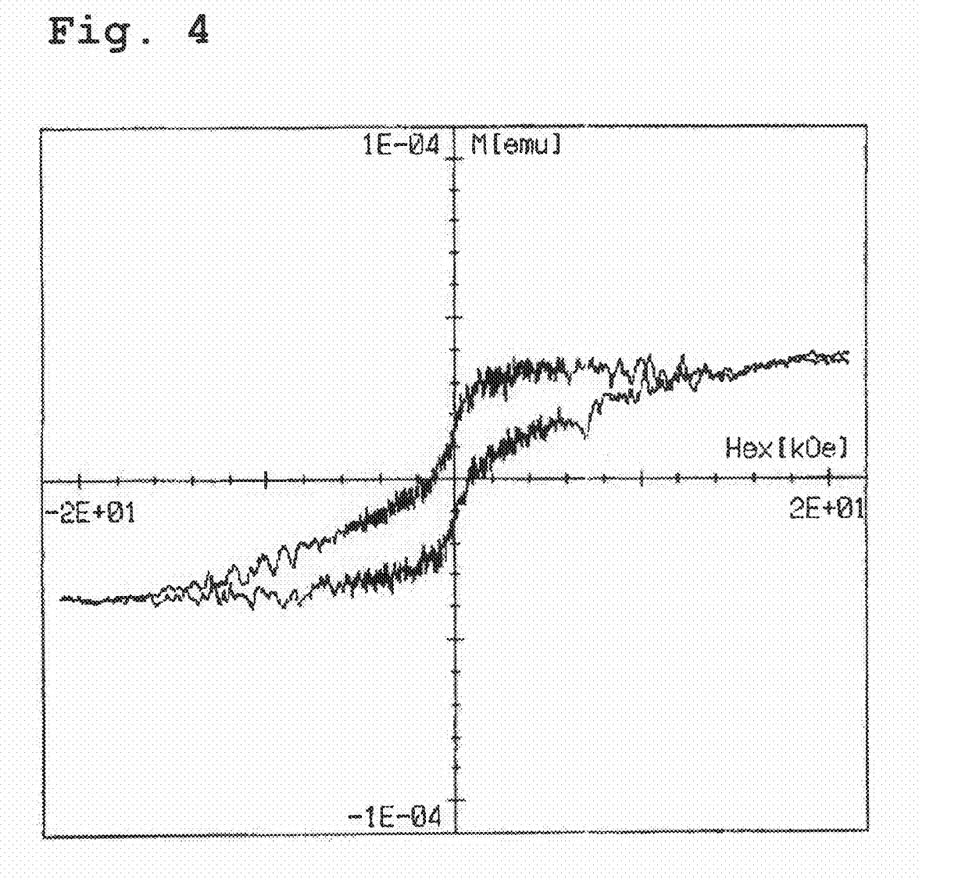

With the exception of dissolving a mixture of 70.6 mg of oleic acid and 66.9 mg of oleylamine as a coordinating organic protective agent instead of the PVP used in example 2, a dark red-brown colloid was obtained by conducting treatment in the same manner as example 2. TEM confirmed the production of ultra fine nanoparticles having an average particle size μ of 0.7 nm and a standard deviation 6 of 0.08 nm, which are finer than the particles of example 1. EDX detected Pt and Fe, and the intensity ratio was approximately 2:3. VSM revealed magnetic anisotropy, and the coercive force was 0.98 kOe. The MH plot for the FePt ordered alloy nanoparticles of example 3 is shown in FIG. 4.

Example 4

Figure 5:
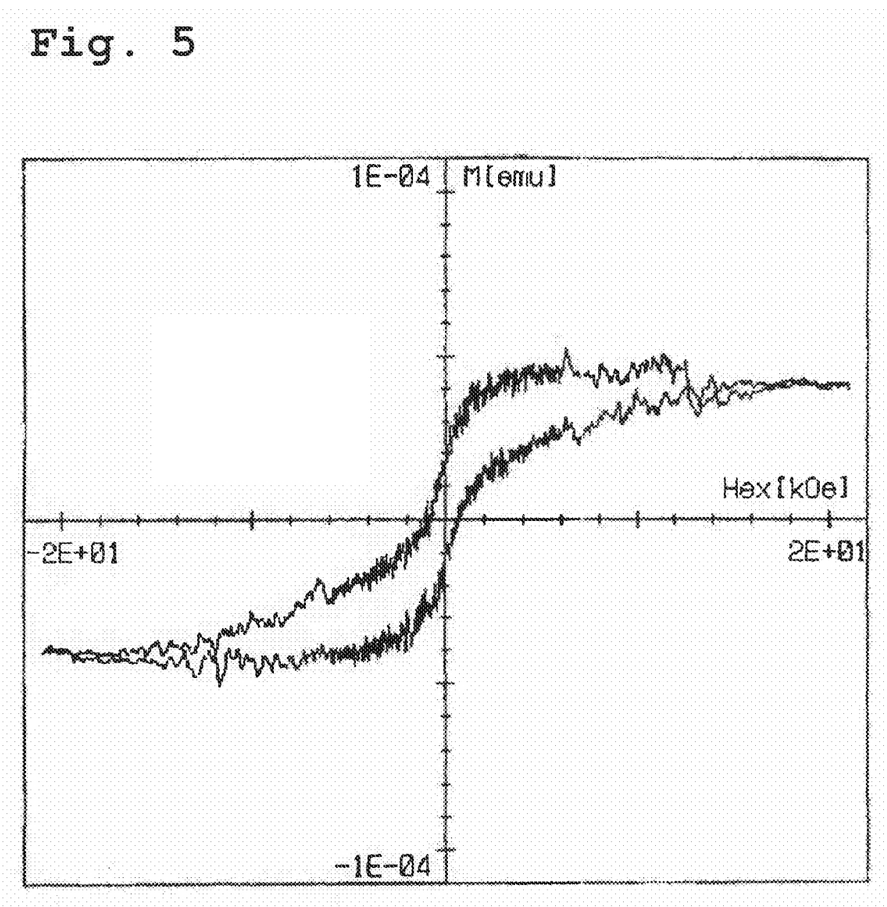

With the exception of using 50 mL of 2-dimethoxyethanol instead of the solvent ethanol used in example 2, a dark red-brown colloid was obtained by conducting treatment in the same manner as example 2. TEM revealed an average particle size 1 of 2.0 nm and a standard deviation a of 0.5 nm. EDX detected Pt and Fe, and the intensity ratio was approximately 3:2. VSM revealed magnetic anisotropy, and the coercive force was 0.73 kOe. The MH plot for the FePt ordered alloy nanoparticles of example 4 is shown in FIG. 5.

Example 5

Figure 6:
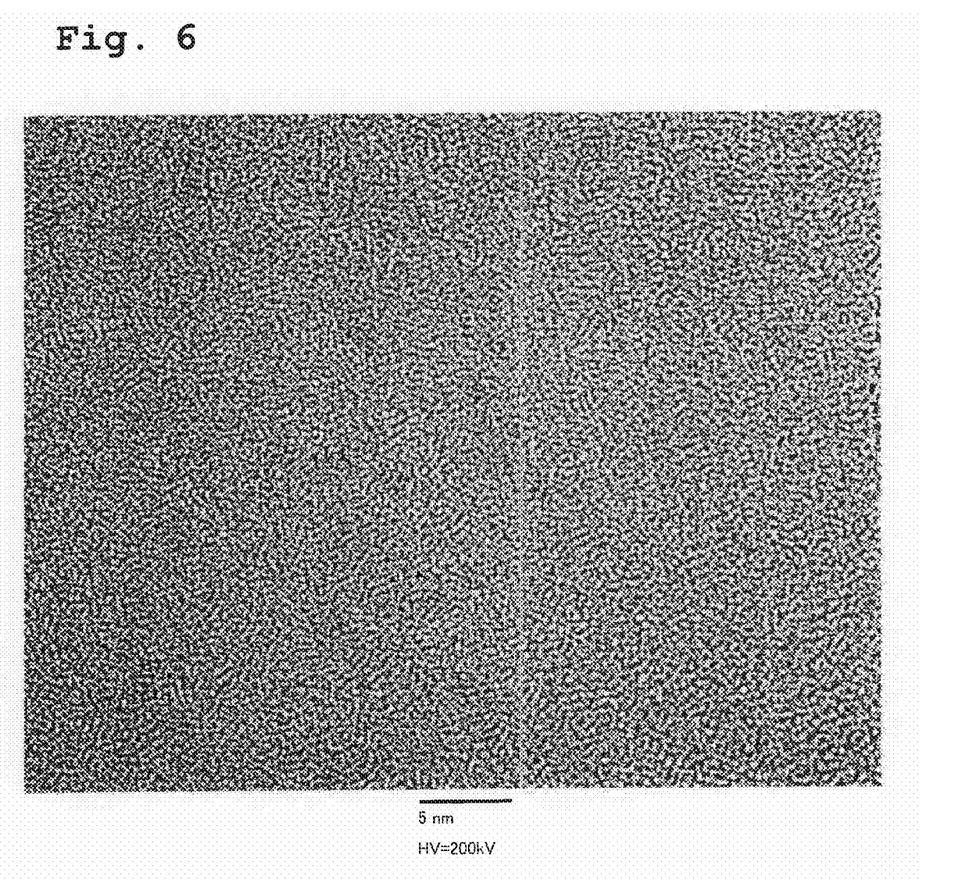

A quartz beaker was charged with 50 mL of ethanol as a solvent, and 47.1 mg of iron (III) acetylacetonate, 20.4 mg of palladium (II) acetylacetonate, 70.6 mg of oleic acid and 66.9 mg of oleylamine were dissolved in the solvent. Following nitrogen substitution of the atmosphere, a Nd:YAG laser (third harmonic: wavelength 355 nm) was irradiated through the side surface of the quartz beaker for a period of 40 minutes, using a beam diameter of 9.5 mm, laser power of 0.9 to 1.0 W, and a frequency of 10 Hz. The initial orange-brown transparent solution changed to a black colloid solution. Inspection of the colloid using a TEM confirmed the generation of ultra fine nanoparticles with a narrow particle size distribution, having an average particle size μ of 1.5 nm and a standard deviation a of 0.2 nm. EDX confirmed a FePd alloy with a Pd:Fe atomic ratio of 1:1. FIG. 6 shows a TEM image of the FePd alloy nanoparticles of example 5.

Example 6

Figure 7:
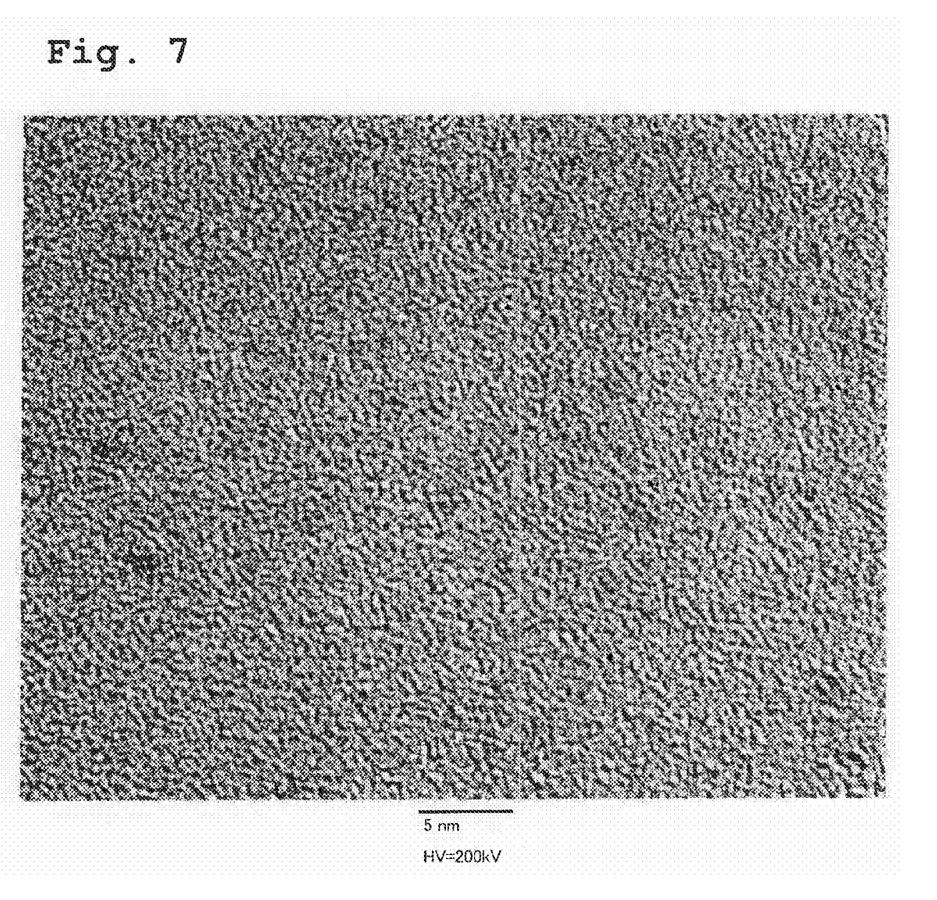

With the exceptions of using 47.4 mg of cobalt (III) acetylacetonate instead of the iron (III) acetylacetonate used in example 5, using 26.2 mg of platinum (II) acetylacetonate instead of the palladium (II) acetylacetonate, replacing the Nd:YAG laser with a KrF excimer laser (wavelength: 248 nm) at 23.5 kV and a laser power of 400 mJ and irradiating for 20 minutes, a black colloid solution was obtained in the same manner as example 5. Inspection of the colloid using a TEM confirmed the generation of ultra fine nanoparticles with a narrow particle size distribution, having an average particle size μ of 1.0 nm and a standard deviation a of 0.2 nm. In an EDX analysis of these particles, the Pt:Co atomic ratio was 1:1, and a CoPt alloy was identified. FIG. 7 shows a TEM image of the CoPt alloy colloid of example 6.

Comparative Example 1

Using the production method of S. Sun et al. (Non-Patent Document 1), Fe—Pt nanoparticles were produced by the polyol method in the manner described below.

A Pyrex beaker was charged with 30 mL of octyl ether, the atmosphere was replaced with argon gas, 0.197 g of platinum acetylacetonate, 0.177 g of iron acetylacetonate and 0.52 g of 1,2-hexadecanediol were added, the mixture was heated to 95° C. under stirring, and the temperature was held for 10 minutes to obtain an entirely uniform solution. 0.16 mL of oleic acid and 0.17 mL of oleylamine were added, the temperature was raised by heating under constant stirring, and the system was held under reflux for 5 hours at 263° C. Following cooling to room temperature, the resulting black colloid was sampled, dripped onto a non-reflective silicon substrate, air-dried, and then subjected to XRD measurement. The (111) peak at 2θ=40 deg attributable to a Fe—Pt solid solution alloy was detected, and the crystallite diameter was measured at 4 nm, but absolutely no peak was detected in the vicinity of 2θ=23 deg that is attributable to the ordered alloy (001).

The VSM magnetic property of the colloid sample was evaluated using the same method as that described for example 1, but no hysteresis loop was obtained, and the coercive force was 0.

BRIEF DESCRIPTION OF DRAWINGS

FIG. 1

Shows a TEM photograph of FePt ordered alloy nanoparticles of the present invention obtained in example 2.

FIG. 2

Shows an XRD pattern and peak separation curves for the FePt ordered alloy nanoparticles of the present invention obtained in example 2.

FIG. 3

Shows a VSM magnetic property MH plot for the FePt ordered alloy nanoparticles of the present invention obtained in example 2.

FIG. 4

Shows a VSM magnetic property MH plot for FePt ordered alloy nanoparticles of the present invention obtained in example 3.

FIG. 5

Shows a VSM magnetic property MH plot for FePt ordered alloy nanoparticles of the present invention obtained in example 4.

FIG. 6

Shows a TEM photograph of FePd alloy nanoparticles of the present invention obtained in example 5.

FIG. 7

Shows a TEM photograph of CoPt alloy nanoparticles of the present invention obtained in example 6.

The invention claimed is:

1. A method for producing metal nanoparticles, comprising:
   (A) dissolving a salt and/or complex of a metal element and a coordinating organic protective agent in a solvent to produce a solution containing the salt and/or complex of a metal and the coordinating organic protective agent, followed immediately by
   (B) irradiating the solution thus obtained with laser light, thereby decomposing and/or reducing the salt and/or complex within the solution and directly generating metal nanoparticles having an average particle size within a range from 0.3 to 3 nm within the solution wherein, during irradiation of the solution with the laser light, said coordinating organic protective agent coordinates with the generated metal nanoparticles and prevents aggregation thereof.

2. The method according to claim 1, wherein the laser light is excimer pulsed laser light or Nd:YAG laser light.

3. The method according to claim 1 wherein a decomposition-reduction promoter that absorbs the laser light and promotes the decomposition and/or reduction of the salt and/or complex of the metal is added to the solution.

4. The method according to claim 3, wherein the decomposition-reduction promoter is an oxygen-containing organic compound.

5. The method of claim 4, wherein the decomposition-reduction promoter is an alcohol.

6. The method of claim 5, wherein the alcohol is ethanol.

7. The method according to claim 1, wherein the salt and/or complex of the metal element is a salt and/or complex of one metal element selected from the group consisting of platinum, palladium, gold, silver, rhodium, ruthenium and iridium.

8. The method according to claim 1, wherein the coordinating organic protective agent is an organic compound having a $R^4$-X structure wherein $R^4$ represents an alkyl group, alkenyl group, aralkyl group or aryl group, and X represents a $NH_2$ group, CN group, COOH group, OH group or SH group, an organic compound having a $R^1$—Y—$R^2$ structure wherein $R^1$ and $R^2$ each represent, independently, an alkyl group, aralkyl group or aryl group, or alternatively, $R^1$ and $R^2$ are linked together to form a divalent group, and Y represents O, S, C=O, C=NH or NHCO, an organic compound having a $ZR^1R^2R^3$ structure wherein $R^1$ and $R^2$ and $R^3$ each represent independently an alkyl group, aralkyl group or aryl group, or alternatively, $R^1$ and $R^2$, $R^2$ and $R^3$, or $R^3$ and $R^1$ may be linked together to form a divalent group, and Z represents N or P, a C6 to C1B long-chain alkylamine, carboxylic acid, ether, nitrile, tertiary amine polymer, polyether. polyester or polyamide, containing a coordinating functional group X, Y or Z wherein X, Y and Z are as defined above, or a combination of two or more of these compounds.

9. The method according to claim 1, wherein the coordinating organic protective agent is citric acid monohydrate. poly-N-vinylpyrrolidone, oleic acid, oleylamine or a combination of two or more thereof.

10. The method according to claim 1, wherein the metal nanoparticles have an average particle size within a range from 0.3 to 2.0 nm.

11. A method for producing metal nanoparticles, comprising:
    (A) dissolving a salt and/or complex of a metal element and a coordinating organic protective agent in a solvent to produce a solution containing the salt and or complex of a metal and the coordinating organic protective agent, followed immediately by
    (B) irradiating the solution thus obtained with laser light, thereby decomposing and/or reducing the salt and/or complex within the solution and directly generating metal nanoparticles having an average particle size within a range from 0.3 to 100 nm within the solution wherein, during irradiation of the solution with the laser light, said coordinating organic protective agent coordinates with the generated metal nanoparticles and prevents aggregation thereof,
    wherein the salt and/or complex of the metal element comprises a salt and/or complex of at least one element selected from the group consisting of platinum, palladium, gold, silver, rhodium, ruthenium and iridium (group A), and a salt and/or complex of at least one element selected from the group consisting of iron, cobalt, nickel, copper and chromium (group B), and the obtained metal nanoparticles are composed of an alloy of these elements.

12. The method of claim 11, wherein the average particle size of the metal nanoparticles is from 0.3 to 10 nm.

13. The method of claim 11, wherein the average particle size of the metal nanoparticles is from 0.3 to 3 nm.

14. The method of claim 11, wherein the alloy is a solid solution alloy of an element of the group A and an element of the group B.

15. The method of claim 11, wherein the alloy is an ordered alloy of an element of the group A and an element of the group B.

* * * * *